(12) United States Patent
Nussbaum et al.

(10) Patent No.: US 7,346,747 B1
(45) Date of Patent: Mar. 18, 2008

(54) EXCLUSIVE LEASE INSTRUCTION SUPPORT FOR TRANSIENT BLOCKING SYNCHRONIZATION

(75) Inventors: Daniel S. Nussbaum, Cambridge, MA (US); Mark S. Moir, Hampton, NH (US); Nir N. Shavit, Cambridge, MA (US); Guy L. Steele, Lexington, MA (US)

(73) Assignee: Sun Microsystem, Inc., Santa Clara, CA (US)

( * ) Notice: Subject to any disclaimer, the term of this patent is extended or adjusted under 35 U.S.C. 154(b) by 311 days.

(21) Appl. No.: 11/078,120

(22) Filed: Mar. 11, 2005

Related U.S. Application Data

(63) Continuation-in-part of application No. 10/918,062, filed on Aug. 13, 2004.

(51) Int. Cl.
*G06F 12/00* (2006.01)

(52) U.S. Cl. .................. 711/154; 711/150; 711/152

(58) Field of Classification Search ................. 711/154
See application file for complete search history.

(56) References Cited

U.S. PATENT DOCUMENTS

| | | | |
|---|---|---|---|
| 4,561,051 A | 12/1985 | Rodman et al. | |
| 4,858,116 A | 8/1989 | Gillet et al. | |
| 5,301,290 A * | 4/1994 | Tetzlaff et al. | 711/142 |
| 5,428,761 A | 6/1995 | Herlihy et al. | |
| 5,875,342 A * | 2/1999 | Temple | 710/260 |
| 5,892,955 A | 4/1999 | Ofer | |
| 5,991,845 A | 11/1999 | Bohannon et al. | |
| 6,370,625 B1 | 4/2002 | Carmean et al. | |
| 6,745,274 B1 | 6/2004 | Snyder et al. | |
| 6,782,452 B2 | 8/2004 | Williams, III | |
| 6,958,507 B2 | 10/2005 | Atwood et al. | |
| 2002/0078307 A1 | 6/2002 | Zahir | |
| 2002/0188590 A1 | 12/2002 | Curran et al. | |
| 2004/0015642 A1 | 1/2004 | Moir et al. | |
| 2005/0038964 A1 | 2/2005 | Hooper et al. | |
| 2006/0036850 A1 | 2/2006 | Enokida | |

OTHER PUBLICATIONS

Murice Herlihy, A Methodology for Implementing Highly Concurrent Data Objects, ACM Transactions on Programming Languages and Systems, vol. 15, No. 5, Nov. 1993, pp. 745-770.

Nir Shavit, et al., Elimination Trees and The Contruction of Pools and Stacks, 7th Annual Symposium on Parallel Algorithms and Architectures (SPAA), 30 pages.

Thomas E. Anderson, The Performance of Spin Lock Alternatives for Shared-Memory Multiprocessors, IEEE Transactions on Parallel and Distributed Systems, vol. 1, No. 1, Jan. 1990, pp. 6-16.

(Continued)

*Primary Examiner*—Hyung S. Sough
*Assistant Examiner*—Shawn Eland
(74) *Attorney, Agent, or Firm*—Osha·Liang LLP

(57) ABSTRACT

A computer system uses transient blocking synchronization for performing operations on shared memory. When performing operations on more than one memory location, the computer system obtains transient exclusive access to a first memory location. The computer system then obtains transient exclusive access to a second memory location, where the transient exclusive access to the second memory location does not expire prior to an expiration of the transient exclusive access to the first memory location or until explicitly unleased.

19 Claims, 1 Drawing Sheet

OTHER PUBLICATIONS

Maged M. Michael. Safe Memory Reclamation for Dynamic Lock-Free Objects Using Aomic Reads and Writes. PODC 2002 Jul. 21-24, 2002.

John M. Mellor-Crummey, et al. Algorithms for Scalable Synchronization on Shared-Memory Multiprocessors. ACM Transactions on Computer Systems, vol. 9, No. 1, Feb. 1991, pp. 21-65.

Maged M. Michael, et al. Nonblocking Algorithms and Preemption-Safe Locking on Multidprogrammed Shsred Memory Multiprocessors. Journal of Parallel and Distributed Computing 51, Article No. PC981446, 1998, pp. 1-26.

Maurice P. Herlihy, et al. Linearizability: A Correctness Condition for Concurrent Objects Objects, ACM Transactions on programming Languages and Systems, vol. 12, No. 3, Jul. 1990, pp. 463-492.

Maurice Herlihy, et al. The Repeat Offender Problem: A Mechanism for Supporting Dynamic-Sized Lock-Free Data Structures. 15 pages.

Murice Herlihy, et al. Scalable Concurrent Counting. In the Proceedings of the 3rd Annual ACM Symposium on Parallel Algorithms and Architectures, Jul. 1992, pp. 1-31.

Nir Shavit, et al. A Steady State Analysis of Diffracting Trees. pp. 1-26.

Nir Shavit, et al. Diffracting Trees. In the Proceedings of the Annual Symposium on Parallel Algorithms and Architectures (SPAA), Jun. 1994, pp. 0-49.

Nir Shavit, et al. Combining Funnels: A Dynamic Approach To Software Combining. Principals of Distributed Computing (PODC98). pp. 1-30.

Beng-Hong Lim, et al. Waiting Algorithms for Synchronization in Large-Scale Multiprocessors. ACM Transactions on Computer Systems, vol. 11, No. 3, Aug. 1993, pp. 1-39.

Maged M. Michael, et al. Simple, Fast, adn Practical Non-Blocking and Blocking Concurrent Queue Algorithms. 8 pages.

Ravi Rajwar, et al. Speculative Lock Elision: Enabling Highly Concurrent Multithreaded Execution. In the proceedings of the 34th International Symposium on Microarchitecture (MICRO), Dec. 3-5, 2001, 12 pages.

John D. Valois. Implementing Lock-Free Queues. In proceedings of the Seventh International Conference on Parallel and Distributed Computing Systems, Las Vegas, NV, Oct. 1994, pp. 1-9.

Sundeep Prakash, et al. Non-Blocking Algorithms for Concurrent Data Structures. pp. 1-40.

John M. Mellor-Crummey, et al. Algorithms for Scalable Synchronization on Shared-Memory Multiprocessors. Jan. 1991, 42 pages.

Peter Magnusson, et al. Queue Locks on Cache Coherent Multiprocessors.7 pages.

Travis S. Craig. Building FIFO and Priority-Queuing Spin Locks from Atomic Swap. pp. 1-29.

Yehuda Afek, et al. Atomic Snapshots of Shred Memory. pp. 1-21 A Preliminary version of this paper appeared in the *Proceedings of the 9th Annual ACM Symposium on Principles of Distributed Computing*, (Quebec City, Quebec, Aug.) ACM, New York, 1990, pp. 1-14.

Ole Agesen, et al. DCAS-Based Concurrent Deques. 10 pages.

Maurice Herlihy. Wait-Free Synchronization. ACM Transactions on Programming Languages and Systems, vol. 11, No. 1, Jan. 1991, pp. 124-149.

Mark Moir. Practical Implementations of Non- Blocking Synchronization Primitives.10 pages.

Maurice Herlihy, et al. Obstruction-Free Synchronization: Double-Ended Queues as an Example. 8 pages.

Gray, et al.; "Leases: An Efficient Fault-Tolerant Mechanism for Distributed File Cache Consistency"; ACM, pp. 202-204, 1989.

\* cited by examiner

EXCLUSIVE LEASE INSTRUCTION SUPPORT FOR TRANSIENT BLOCKING SYNCHRONIZATION

CROSS-REFERENCE TO RELATED APPLICATIONS

This application is a continuation-in-part of U.S. patent application Ser. No. 10/918,062, entitled "Computer System and Method for Leasing Memory Location to Allow Predictable Access to Memory Location" and filed on Aug. 13, 2004, and hereby incorporates by reference the entirety of that application. Further, this application cross-references U.S. patent application Ser. No. 11/078,117, entitled "Shared Lease Instruction Support for Transient Blocking Synchronization" and filed on Mar. 11, 2005, and hereby incorporates by reference the entirety of that application.

STATEMENT REGARDING FEDERALLY SPONSORED RESEARCH OR DEVELOPMENT

The present invention was made with the support of the government of the United States under contract NBCH020055 awarded by the Defense Advanced Research Projects Administration. The United States government may have certain rights in the present invention.

BACKGROUND

A modern computer system has at least a microprocessor and some form of memory. Generally, the processor retrieves data stored in the memory, processes/uses the retrieved data to obtain a result, and stores the result in the memory.

An important consideration in multiprocessor system design involves the potential of two or more processors attempting to access and/or store data in the same memory location at the same time. Thus, designers have implemented, using both software and/or hardware, various "synchronization" techniques to address the issue of threads (i.e., sequences of instructions being processed by a processor) concurrently attempting to access the same memory location.

Synchronization can be implemented by a processor "blocking" other processors from accessing or storing data to a particular memory location, i.e., a processor maintains exclusive, uninterruptible ownership of a particular memory location. However, maintaining exclusive ownership of a memory location may produce a high number of failures and/or deadlocks, particularly for large-scale multiprocessor systems (e.g., systems having thousands of processors running in parallel). Such large-scale multiprocessor systems tend to require higher levels of robustness and tolerance than that provided by blocking synchronization techniques due to increased delays and fluctuations in communication time and the effects of fast context switching typical of large-scale multiprocessor systems.

At least partly in order to address the drawbacks of blocking synchronization techniques, "non-blocking" synchronization techniques have emerged that allow multiple processors to access concurrent objects in a non-mutually exclusive manner to meet the increased performance requirements of large-scale multiprocessor systems. Non-blocking synchronization may be implemented through hardware and software components in a variety of ways. For example, in a multiprocessor system, a combination of instruction primitives and registers is used to achieve non-blocking synchronization in a multiprocessor system.

In one manner, a processor sends a Load-Linked request to a controller to load a value from a memory location, which, in turn, sets a bit associated with the memory location. The bit is cleared when a Store-Conditional operation executed by any processor in the system is performed on the memory location. Once the value has been successfully loaded, the processor executes one or more instructions to manipulate the loaded value. The processor then issues a Store-Conditional request that attempts to store the manipulated value back to the memory location. However, the value is only stored to that memory location if the associated bit in the controller has not been unset (i.e., if no other processor has written to the memory location since the Load-Linked request). If the Store-Conditional request succeeds, this indicates that all three steps (i.e., the Load-Linked operation, the loaded value manipulation, and the Store-Conditional operation) occurred atomically (i.e., as a single, uninterrupted sequence). On the other hand, if the Store-Conditional request fails, the data is not stored in that memory location. In this case, the instruction sequence including the Store-Conditional/Load-Linked instruction pair may be said to have "failed." When this happens, the system may retry that instruction sequence.

The implementation of the Load-Linked/Store-Conditional primitives in non-blocking synchronization has two distinct features. First, all Load-Linked requests are required to succeed. Secondly, all Load-Linked requests require some sort of recording (or tracking) by hardware.

Recording Load-Linked requests may require that a controller notify all processors that initiated Load-Linked requests whenever a Store-Conditional request invalidates them, essentially mimicking a cache coherence protocol. Alternatively, a record may be maintained in each controller for every initiated Load-Linked request. In this case, the Load-Linked request is only removed from the record of the controller once a successful Store-Conditional request occurs. Because the completion of a Store-Conditional request cannot be forecasted, the latter option requires support for lists of unbounded size, which complicates controller design.

Another type of non-blocking synchronization technique involves the use of Compare&Swap primitives. A Compare&Swap operation typically accepts three values, or quantities: a memory address A, a comparison value C, and a new value N. The operation fetches and examines the contents V of memory at address A. If those contents V are equal to C, then N is stored into the memory location at address A, replacing V. A boolean return value indicates whether the replacement occurred. Depending on whether V matches C, V is returned or saved in a register for later inspection (possibly replacing either C or N depending on the implementation).

The Load-Linked/Store-Conditional and Compare&Swap operations described above are examples of instructions that can be used as building blocks for optimistic non-blocking synchronization schemes. Typical optimistic non-blocking synchronization schemes do not hold ownership and must optimistically check to make sure they were not interrupted, thereby possibly introducing implementation and user-level problems that require costly solutions and/or weakened semantics. Further, these non-blocking synchronization implementations put the burden of coordination on the threads and are typically incompatible with fast context-switching, which is an important technology often used to hide memory access latencies in large-scale multiprocessor systems.

SUMMARY

According to one aspect of one or more embodiments of the present invention, a computer system capable of executing a plurality of processes comprises (i) at least one processor and (ii) a memory operatively connected to the at least one processor and comprising a plurality of memory locations shared by the plurality of processes, where the computer system further comprises instructions to: obtain transient exclusive access to one of the plurality of memory locations; and obtain transient exclusive access to another one of the plurality of memory locations, where an expiration of the transient exclusive access to the another one of the plurality of memory locations is dependent on the transient exclusive access to the one of the plurality of memory locations.

According to another aspect of one or more embodiments of the present invention, a computer system capable of executing a plurality of processes comprises at least one processor capable of executing at least one of the plurality of processes; and memory operatively connected to the at least one processor and having a plurality of memory locations shared by the plurality of processes, (i) where, in response to a request by one of the plurality of processes to perform operations on the plurality of memory locations, the plurality of memory locations are each transiently restricted from being accessed by another one of the plurality of processes, and (ii) where an expiration of a period of time that at least one of the plurality of memory locations is transiently restricted is dependent on a state of another memory location of the plurality of memory locations.

According to another aspect of one or more embodiments of the present invention, a method of performing operations in a shared-memory multiprocessor computer system comprises obtaining transient exclusive access to a first memory location and obtaining transient exclusive access to a second memory location, where the transient exclusive access to the second memory location is linked to the first memory location such that the transient exclusive access to the second memory location does not expire prior to an expiration of the transient exclusive access to the first memory location.

According to another aspect of one or more embodiments of the present invention, a shared-memory multiprocessor computer system having instructions for synchronizing operations on memory comprises instructions to (i) obtain transient exclusive access to a first memory location of a transaction involving a plurality of shared memory locations and (ii) obtain transient exclusive access to a second memory location of the transaction, where the transient exclusive access to the second memory location does not expire prior to an expiration of the transient exclusive access to the first memory location.

According to another aspect of one or more embodiments of the present invention, a computer system capable of executing a plurality of processes comprises: at least one processor capable of executing at least one of the plurality of processes; a memory operatively connected to the at least one processor, the memory having a plurality of memory locations shared by the plurality of processes; and a controller configured to, in response to a request by one of the plurality of processes to perform read-modify-write operations on the plurality of memory locations, transiently restrict access to the plurality of memory locations by at least another of the plurality of processes, where an expiration of transiently restricted access to one of the plurality of memory locations is dependent on a state of another memory location of the plurality of memory locations.

According to one aspect of one or more embodiments of the present invention, a computer system comprises: at least one processor; a memory operatively connected to the processor and accessible by a plurality of processes; and instructions to (i) obtain an exclusive lease on a first memory location in response to an associated request by one of the plurality of processes, and (ii) obtain an exclusive lease on a second memory location, where the exclusive lease on the second memory location is linked to the first memory location such that the exclusive lease on the second memory location does not expire prior to an expiration of the exclusive lease on the first memory location.

Other aspects of the invention will be apparent from the following description and the appended claims.

DETAILED DESCRIPTION

Figure 1:
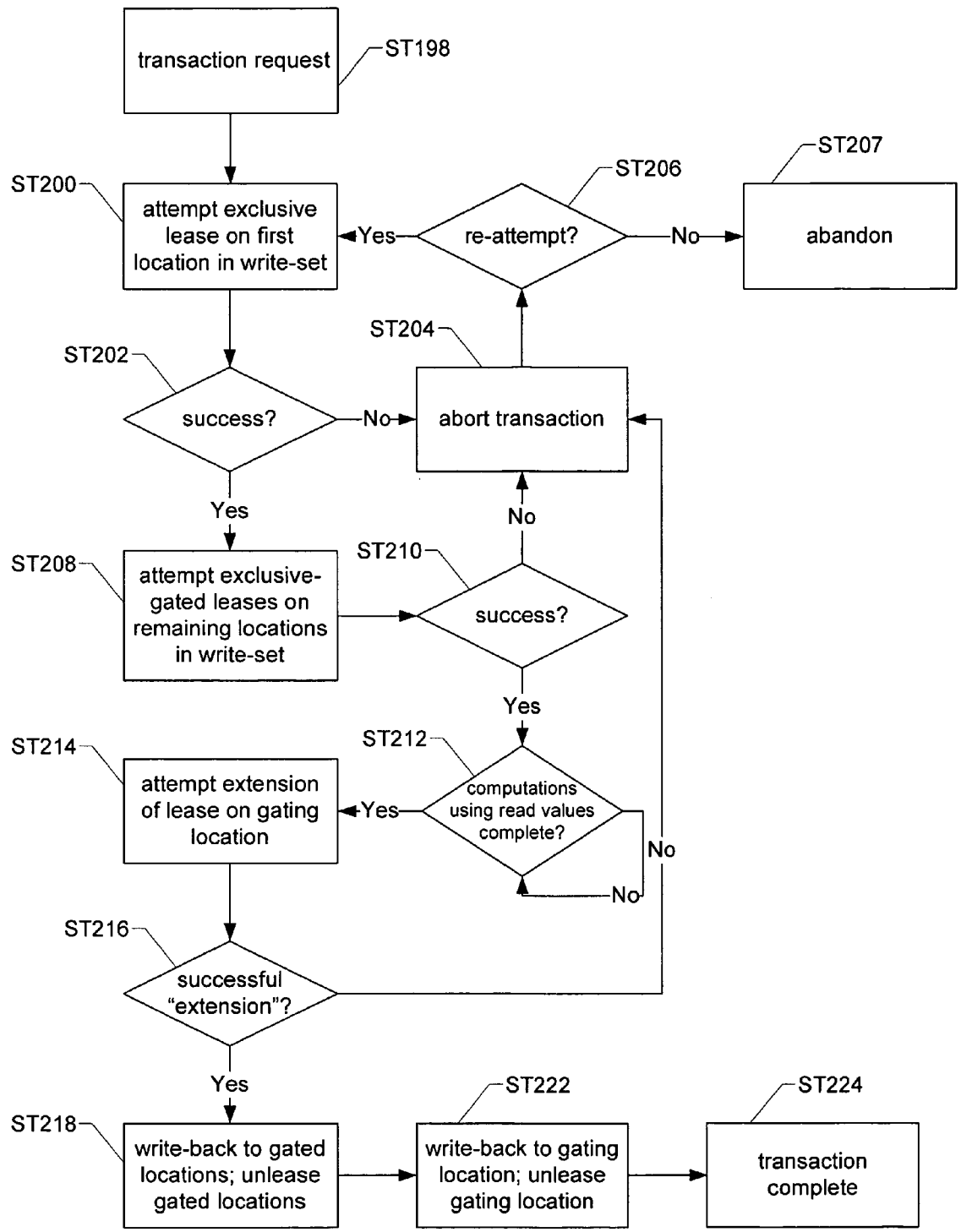
FIG. 1 shows a flow process in accordance with an embodiment of the present invention.

In addition to the Load&Lease, Store&Unlease, and other instructions described in U.S. patent application Ser. No. 10/918,062 referenced above, embodiments of the present invention relate to further instruction support for the implementation and use of transient blocking synchronization.

In transient blocking synchronization, an exclusive lease on a memory location is essentially a "lock" on the memory location that expires after a particular amount of time if not explicitly "unlocked" prior to the expiration of the particular amount of time. At any time, at most one thread may have an exclusive lease on a memory location, and only that thread may write to that memory location during the pendency of the exclusive lease. Because an exclusive lease on a memory location exists for a limited amount of time, the exclusive lease or "lock" is referred to as being "transient."

One type of exclusive lease instruction in transient blocking synchronization is the Load&Lease instruction described in U.S. patent application Ser. No. 10/918,062 referenced above. Another type of exclusive lease instruction that may be used to support transient blocking synchronization is a Load&Lease-Gated instruction further described below.

A Load&Lease-Gated instruction leases a memory location (i.e., the "gated" location) for a specified period of time. However, the lease may not expire before the expiration of a lease on another memory location (i.e., the "gating" location). Accordingly, before attempting to expire the lease on the gated location, if the lease on the gating location is still pending, the lease on the gated location is effectively extended as the lease on the gated location may not expire before the lease on the gating location. Thus, in one or more embodiments of the present invention, an exclusive lease instruction has at least three parameters: a first memory location (i.e., the location to be leased by the instruction), a lease time for the first memory location, and a second memory location (i.e., the location having a lease on which the expiration of the lease on the first memory location is dependent).

In one or more embodiments of the present invention, a Load&Lease-Gated instruction may be used in a transaction, which is a set of operations involving a plurality of memory locations shared by a plurality of processes. A transaction may update all shared variables that the transaction accesses. With reference to the exemplary transaction shown below, a Load&Lease operation is performed on a first shared memory location x of the transaction with lease period t (line 1). This first shared memory location x is thus selected as the "gating" location; all other shared memory locations accessed by the transaction are said to be "gated" by the first shared memory location x.

Assuming that the Load&Lease operation on first shared memory location x is successful, a series of Load&Lease-Gated operations are then performed to exclusively lease shared memory locations y and z for lease period t, where the first shared memory location x is specified as the "gating" location (lines 2-3).

```
1 Load&Lease(&x, t)/* gating location*/
2 Load&Lease-Gated (&y, t, &x)/* gated location */
3 Load&Lease-Gated (&z, t, &x)/* gated location*/
4 Load&Lease(&x, t+)/* commit point */
5 if (P!=1), return ERR /* verify continuous ownership of gating location */
6 Store&Unlease (&y, <val0>)/* writeback, unlease */
7 Store&Unlease (&z, <val1>)/* writeback, unlease */
8 Store& Unlease (&x, <val2>)/* writeback, unlease */
```

Once the transaction finishes its computations using the values read in lines 1-3 of the transaction, the transaction is ready to commit. The completion of the transaction is commenced by extending the lease on the "gating" location. Such extension of the lease on the "gating" location may be achieved by performing a Load&Lease operation on a memory location already leased by the same thread performing the Load&Lease operation. For example, referring again to the exemplary transaction shown above, a Load&Lease operation is performed on the first shared memory location x with a long lease period t+ (line 4), thus extending the lease on "gating" location x and thereby effectively extending the leases on "gated" locations y and z. If the lease on the "gating" location is successfully extended, this marks the "commit point" of the transaction.

On the other hand, if the transaction prior to the operation in line 4 takes longer than the lease period t on memory location x invoked by the Load&Lease operation in line 1, the Load&Lease operation in line 4, if it succeeds, would effectively result in obtaining a "new" lease on memory location x, not an "extended" lease as described above. In this case, because the lease on memory location x has not been maintained throughout the entirety of the transaction, the transaction may be caused to fail by an instruction used to verify continuous ownership by the transaction of memory location x (line 5, where P!=1 indicates that the lease originally owned by the transaction expired prior to the execution of line 4). In a case where delays are incurred prior to the commit point, thereby resulting in obtaining a "new" lease, not an "extended" one, on the "gating" location, the transaction may be aborted (thereby allowing other threads to proceed with operations on memory locations previously owned by the now-aborted transaction) and may be retried with, for example, a longer initial lease period.

In the case that the lease on the "gating" location is successfully extended in line 4 (i.e., at the commit point of the transaction), a series of Store&Unlease operations are performed on "gated" locations y and z with values val0 and val1, respectively (lines 6-7), thereby selectively writing new values to shared memory locations y and z and "explicitly" removing the leases (i.e., without regard to lease time) on shared memory locations y and z. Then, the transaction performs a Store&Unlease operation on the "gating" location x with value val2 (line 8), thereby selectively writing a new value to shared memory location x and explicitly removing the lease on memory location x and completing the transaction.

In such a case where delays are incurred prior to the commit point, the transaction is aborted (thereby allowing other threads to proceed with operations on memory locations previously owned by the now-aborted transaction) and may be retried with, for example, a longer initial lease period.

In one or more embodiments of the present invention, a system is configured to detect the failure of instructions in a Load&Lease-Gated-based transaction. For example, with reference to the exemplary transaction shown above, if the Load&Lease operation in line 1 fails, this indicates that a process other than the one attempting the Load&Lease operation has a lease on memory location x. If the Load&Lease-Gated operation in line 2 fails, this indicates that a process other than the one attempting the Load&Lease-Gated operation has a lease on memory location y.

If the Load&Lease-Gated operation in line 3 fails, this indicates that a process other than the one attempting the Load&Lease-Gated operation has a lease on memory location z. If the Load&Lease operation in line 4 fails, this may indicate that either (i) the lease on memory location x invoked in line 1 expired prior to the Load&Lease operation in line 4 and (ii) a process other than the one attempting the Load&Lease operation subsequently obtained a lease on memory location x after the expiration of the lease on memory location x invoked in line 1.

If any of the Store& Unlease operations in lines 6-8 fail, this indicates that the system is experiencing hardware and/or network problems. It is important to note that if a failure occurs during the writeback phase of the transaction, one or more variables may be successfully written prior to the failure, thereby leaving the system in an inconsistent state upon the failure.

Those skilled in the art will note that upon detection of a failure, various manners of responsive action may be taken. For example, if a Load&Lease or Load&Lease-Gated operation fails, that operation may be tried again or the entire transaction may be aborted and retried in the future. On the other hand, because Store&Unlease operations should not fail in normal operation, if they do, the system treats the failure as it would any other unrecoverable hardware failure. Further, those skilled in the art will note that in one or more embodiments of the present invention, traps or conditional instructions may be used to detect failures.

Those skilled in the art will note that Load&Lease-Gated instructions may be used in a variety of ways and is not limited to the use as shown in the exemplary transaction shown above. Moreover, transactions having various instruction sequences may use one or more Load&Lease-Gated instructions or other instructions having the "gating"/"gated" characteristic described above.

In one or more embodiments of the present invention, the lease period for a "gating" location at the commit point may be set to be relatively very long such that the lease on the "gating" location only expires if an associated system is incurring catastrophic behavior due to, for example, network or hardware failure. During normal behavior, the long lease period is generally inconsequential as Store&Unlease operations of the transaction "unlease" (i.e., explicitly remove leases on) the memory locations accessed by the transaction.

Further, although the lease period parameters in the transaction shown above are shown as being equal, in one or more other embodiments of the present invention, the lease period parameters of differing leases may not be equal.

In one or more embodiments of the present invention, in addition to the parameters for each of the instructions in the exemplary transaction shown above, one or more instructions may have a parameter associated with an identification of the owning transaction so as to tie related instructions to each other. In one or more embodiments of the present invention, without such a parameter, (i) a processor may be associated with an active lease and/or (ii) the system may be configured to ensure that it accurately tracks different transactions concurrently executing on the processor.

In one or more embodiments of the present invention, an operation for testing the validity of a result returned by an instruction in a transaction may be performed at any time. For example, if an unforeseen delay occurs between an operation for leasing a "gating" location and an operation for leasing the first "gated" location in a transaction, values returned by these two operations may be inconsistent due to the expiration of the lease on the "gating" location prior to obtaining the lease on the first "gated" location. In such a case, an operation may be implemented to detect whether the lease on the "gating" location has expired, in which case the transaction is aborted and may be retried.

In one or more embodiments of the present invention, if an exclusive lease period of a particular memory location in a transaction is not long enough, a duration of that lease may be effectively extended by extending the lease on the "gating" location of the transaction. This may be implemented by, for example, performing a Load&Lease operation on the "gating" location prior to the Load&Lease operation at the expected commit point.

FIG. 1 shows an exemplary flow process in accordance with an embodiment of the present invention. Particularly, FIG. 1 shows a flow process of a transaction implemented using exclusive-gated leases. Upon a transaction request by a thread ST198, the owning thread attempts to acquire an exclusive lease (using, for example, a Load&Lease instruction) on a first memory location in a set of shared memory locations to which the thread desires write access ST200. If the attempt to acquire the exclusive lease in ST200 is unsuccessful ST202, the thread aborts the transaction ST204 and may subsequently re-attempt the transaction ST206. If the transaction is not desired to be re-attempted in ST206, the transaction is abandoned ST207.

Otherwise, if the attempt to acquire the exclusive lease in ST200 is successful ST202, the thread attempts to acquire exclusive-gates leases (using, for example, Load&Lease-Gated instructions) on the remaining locations in the set of shared memory locations to which the thread desires write access ST208, where the memory location leased in ST200 serves as the "gating" location. If the attempt to acquire the exclusive-gated locations in ST208 is unsuccessful ST210, the thread aborts the transaction ST204 and may subsequently re-attempt the transaction ST206. If the transaction is not desired to be re-attempted in ST206, the transaction is abandoned ST207.

Otherwise, if the attempt to acquire the exclusive-gated leases in ST208 is successful 210 and once the computations using the read values in ST200 and ST208 have been completed ST212, the thread commits the transaction by attempting to extend the lease (using, for example, a Load&Lease instruction) on the "gating" location ST214. If the attempt to extend the lease on the "gating" lease in ST214 is unsuccessful ST216 (e.g., the lease operation on the "gating" location fails or results in obtaining a "new" lease, not an "extended" lease), the thread aborts the transaction ST204 and may subsequently re-attempt the transaction ST206. If the transaction is not desired to be re-attempted in ST206, the transaction is abandoned ST207.

Otherwise, if the attempt to extend the lease on the "gating" location in ST214 is successful ST216, the thread selectively writes data back to and unleases the "gated" locations ST218 and the "gating" location ST222, thereby completing the transaction ST224. If any of the write backs to the "gated" locations or the "gating" location fail, this indicates potential unrecoverable hardware failure.

Further, in one or more embodiments of the present invention, a thread may perform a transaction using non-exclusive lease operations in addition to exclusive lease operations. For example, a transaction may be performed using exclusive lease operations and shared lease operations as described in U.S. patent application Ser. No. 11/078,117 entitled "Shared Lease Instruction Support for Transient Blocking Synchronization" referenced above.

In one or more embodiments of the present invention, the use of exclusivegated leases in a transaction allows for the coordination of independent memory locations so that they are non-blocking until the transaction commits and become blocking once the transaction has committed until they are released.

In one or more embodiments of the present invention, because a transaction implemented using exclusive-gated leases fails entirely or succeeds entirely, the transaction may be performed atomically.

In one or more embodiments of the present invention, before expiring a lease on a "gated" location, a message is sent to the "gating" location. If the response indicates that the "gating" location's lease will not expire for a certain period of time, the "gated" location's lease period is set to that period of time. If the "gating" location's lease has expired, then the "gated" location also expires. Such a message exchange may be repeated whenever a lease on a "gated" location is about to expire. Accordingly, exclusive-gates leases may be implemented without coherent caches and/or independent of cache-coherence mechanisms.

In one or more embodiments of the present invention, because a long lease period is set in a transaction only during a write-back phase of a transaction, i.e., once the transaction has committed, fast recovery from unexpected delays, deadlocks, and livelocks may be achieved.

In one or more embodiments of the present invention, because the use of exclusive-gated leases in a transaction may ensure that a lease is held on every shared memory location accessed by a transaction at its commit point, the transaction may be linearizable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system capable of executing a plurality of processes, comprising:
    at least one processor; and
    a memory operatively connected to the at least one processor and comprising a first memory location and a second memory location shared by the plurality of processes, the computer system further comprising instructions to:

obtain a first exclusive lease to the first memory location for a first predetermined period of time to initiate a transaction;

attempt to obtain a second exclusive lease to the second memory location for a second predetermined period of time, wherein the attempt is conditioned on the success of obtaining the first exclusive lease;

obtain, in response to the attempt, the second exclusive lease, wherein the second exclusive lease is obtained during the first predetermined period of time;

perform a calculation using a first value from the first memory location and a second value from the second memory location to obtain a computed value;

attempt to extend the first exclusive lease for the first memory location by extending the first predetermined period of time; and commit the transaction when the attempt to extend the first exclusive lease to the first memory location is successful, wherein the commit comprises storing the computed value in the first memory location.

2. The computer system of claim 1, wherein the computer system further comprises instructions to:

release the second exclusive lease after obtaining the computed value and prior to committing the transaction.

3. The computer system of claim 1, wherein the computer system further comprises instructions to:

abort the transaction when the attempt to extend the first exclusive lease to the first memory location occurs after the first predetermined amount of time has expired.

4. The computer system of claim 1, wherein extending the first exclusive lease extends the second exclusive lease.

5. The computer system of claim 1, wherein the first predetermined period of time is greater than the second predetermined period of time.

6. The computer system of claim 1, wherein the attempt to extend the first exclusive lease is successful when the attempt occurs prior to the expiration of the first predetermined period of time.

7. A method of performing operations in a shared-memory multiprocessor computer system, comprising:

obtaining a first exclusive lease to a first memory location for a first predetermined period of time to initiate a transaction;

attempting to obtain a second exclusive lease to a second memory location for a second predetermined period of time after, wherein the attempt is conditioned on the success of obtaining the first exclusive lease;

obtaining, in response to the attempt, the second exclusive lease, wherein the second exclusive lease is obtained during the first predetermined period of time;

performing a calculation using a first value from the first memory location and a second value from the second memory location to obtain a computed value;

attempting to extend the first exclusive lease for the first memory location by extending the first predetermined period of time; and committing the transaction when the attempt to extend the first exclusive lease to the first memory locations is successful, wherein committing comprises storing the computed value in the first memory location.

8. The method of claim 7, further comprising:

releasing the second exclusive lease after obtaining the computed value and prior to committing the transaction.

9. The method of claim 7, further comprising:

aborting the transaction when the attempt to extend the first exclusive lease to the first memory location occurs after the first predetermined amount of time has expired.

10. The method of claim 7, wherein extending the first exclusive lease extends the second exclusive lease.

11. The method of claim 7, wherein the first predetermined period of time is greater than the second predetermined period of time.

12. The method of claim 7, wherein the attempt to extend the first exclusive lease is successful when the attempt occurs prior to the expiration of the first predetermined period of time.

13. A computer system capable of executing a plurality of processes, comprising:

at least one processor capable of executing at least one of the plurality of processes;

a memory operatively connected to the at least one processor, the memory having a first memory location and a second memory location shared by the plurality of processes; and a controller configured to:

obtain a first exclusive lease to the first memory location for a first predetermined period of time to initiate a transaction;

attempt to obtain a second exclusive lease to the second memory location for a second predetermined period of time, wherein the attempt is conditioned on the success of obtaining the first exclusive lease;

obtain, in response to the attempt, the second exclusive lease, wherein the second exclusive lease is obtained during the first predetermined period of time;

perform a calculation using a first value from the first memory location and a second value from the second memory location to obtain a computed value;

attempt to extend the first exclusive lease for the first memory location by extending the first predetermined period of time; and commit the transaction when the attempt to extend the first exclusive lease to the first memory location is successful, wherein the commit comprises storing the computed value in the first memory location.

14. The computer system of claim 13, wherein the controller is connected to the at least one processor.

15. The computer system of claim 13, wherein the controller is further configured to:

release the second exclusive lease after obtaining the computed value and prior to committing the transaction.

16. The computer system of claim 13, wherein the controller is further configured to:

abort the transaction when the attempt to extend the first exclusive lease to the first memory location occurs after the first predetermined amount of time has expired.

17. The computer system of claim 13, wherein extending the first exclusive lease extends the second exclusive lease.

18. The computer system of claim 13, wherein the first predetermined period of time is greater than the second predetermined period of time.

19. The computer system of claim 13, wherein the attempt to extend the first exclusive lease is successful when the attempt occurs prior to the expiration of the first predetermined period of time.

* * * * *

UNITED STATES PATENT AND TRADEMARK OFFICE
CERTIFICATE OF CORRECTION

PATENT NO.        : 7,346,747 B1  
APPLICATION NO. : 11/078120  
DATED             : March 18, 2008  
INVENTOR(S)       : Daniel S. Nussbaum et al.

It is certified that error appears in the above-identified patent and that said Letters Patent is hereby corrected as shown below:

In Claim 7, Column 9, Line 60, delete "locations" and replace with --location--.

Signed and Sealed this

Fifth Day of August, 2008

JON W. DUDAS  
*Director of the United States Patent and Trademark Office*